INVENTORS
NICKOLAS J. THEMELIS
PETER TARASSOFF 3,561,951
METHOD OF FEEDING COPPER CONCENTRATES IN A CONTINUOUS PROCESS FOR SMELTING AND CONVERTING COPPER CONCENTRATES TO METALLIC COPPER

Nickolas J. Themelis, Beaconsfield, Quebec, and Peter Tarassoff, Dollard des Ormeaux, Quebec, Canada, assignors to Noranda Mines Limited, Toronto, Ontario, Canada Filed Apr. 3, 1967, Ser. No. 627,851
Claims priority, application Great Britain, Apr. 28, 1966, 18,647/66
Int. Cl. C22b 15/00, 15/06, 15/14
U.S. Cl. 75—73                               6 Claims

ABSTRACT OF THE DISCLOSURE

A continuous process for smelting and converting copper concentrates to metallic copper in which the concentrates are fed into the furnace in the form of pellets so as to cover the surface of the liquid bath in the furnace with a thin layer of pellets and in which the pellets are fed in such a way as to prevent the formation of agglomerates of unsmelted pelletized material.

Figure 1:
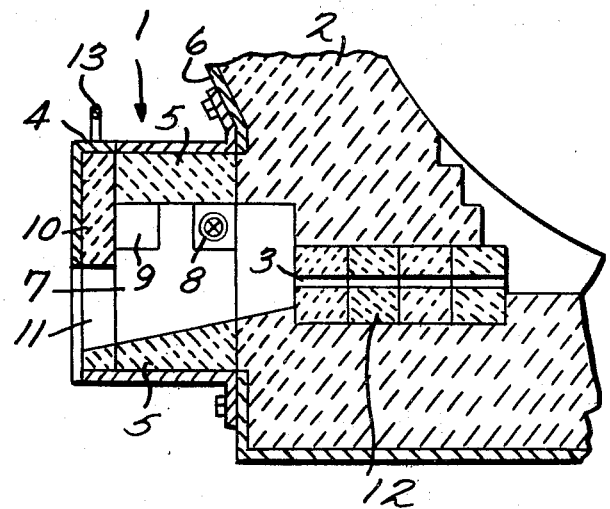

The invention relates broadly to the smelting and converting of copper concentrates to metallic copper.

More particularly, this invention is an improvement in the continuous smelting and converting of copper concentrates to metallic copper whereby the smelting and converting stages occur partly simultaneously and partly in sequence in a single reactor vessel and in which the concentrates are introduced continuously at one end, while the slag and copper metal are removed continuously at the other end of the vessel.

The present invention was developed as an improvement on the continuous process disclosed in U.S. application Ser. No. 423,257 filed Jan. 4, 1965, which issued to U.S. Pat. No. 3,437,475 on Apr. 4, 1969, but may also find use as an extension of other continuous processes for the smelting and converting of copper concentrates to metallic copper.

The basic process just described utilizes certain aspects of well-known copper technology, in conjunction with the concepts of continuous gas-liquid processing which have, up to the present time, mostly been used in chemical processing. The process also includes the treatment of the slag produced by reducing gases or other means in order to obtain the maximum copper extraction from the slag either in an appropriate extension of the reduction reactor or in a separate vessel adjacent to the reactor into which the slag can flow by gravity from the reactor vessel to the said separate vessel.

Broadly speaking the basic process comprises the steps of feeding flux and the concentrates to be converted into said furnace; smelting the concentrates and flux; controlling the resultant flow of matte and slag in the furnace as it flows towards tapping ports formed therein; introducing an oxidizing gas into the matte sufficient to effect a gradual oxidation of the ferrous sulphide; continuing to introduce said oxidizing gas into the resultant white metal in a volume sufficient to effect the gradual oxidation of the copper sulphide to metallic copper; allowing the copper to settle, and thereafter drawing off metallic copper.

According to the present invention a continuous process for smelting and converting copper concentrates to metallic copper comprises the steps of feeding flux and concentrates into a furnace, smelting the concentrates and flux in a liquid bath, allowing the resultant matte and slag to flow toward tapping ports in the furnace, introducing an oxidizing gas into the matte sufficient to oxidize any ferrous sulphide present, introducing an oxidizing gas into the resultant white metal gradually to oxidize copper sulphide to metallic copper, allowing the copper to separate from the slag and tapping the metallic copper, wherein the concentrates are fed into the furnace in the form of pellets in such a manner that a substantial portion of the surface area of the liquid bath is covered with a uniformly disposed thin layer of pellets, the feeding of the pellets being so controlled as to prevent the pellets from forming masses of unsmelted material.

The advantages that can be realized in a continuous smelting and converting process are numerous. In particular, the smelting rate is considerably higher than that which is possible in the conventional reverberatory furnace. In the latter, the charge on the charge banks receives heat mainly by radiation from the combustion flame, from the furnace gases, and from the furnace walls, and the thermal efficiency is not great. Although little or no heat is produced in the molten bath, the bath does represent a source of stored-up heat and the charging of moist concentrate onto the surface of the bath, has been suggested in the prior art, for example, by Kuzell in U.S. Pat. 2,657,990. It has also been suggested in the prior art, for example, in Beals, et al., U.S. Pat. 3,222,162, that smelting rates in the conventional reverberatory furnace can be increased by splashing molten material from the bath onto the charge banks, the molten material being essentially superheated and the splashing being effected by the injection of oxygen-rich gas into the bath in the vicinity of the charge.

In contrast, in a continuous smelting and converting process with which the present improvement may be used, highly exothermic reactions take place in the bath, and the latter represents a heat source which is even more important than that provided by radiation from the combustion flame, from the furnace gases, and from the walls of the continuous smelting and converting apparatus, the bath being in direct contact with the charge to be smelted.

It has now been found that in the continuous smelting and converting process previously mentioned heat transfer to the charge is even further enhanced by preparing the charge in the form of pellets, prior to its introduction into the furnace.

It has also been found that the tapping methods, commonly in use with converters, anode furnaces, wire-bar furnaces, and the like, are not practical for use in conjunction with a continuous smelting and converting apparatus, nor are many of the methods used to tap molten materials, other than copper, from metallurgical furnaces. The presence of a layer of molten sulphide and a layer of slag, above the copper in a continuous smelting and converting apparatus, prevents the use of the conventional overflow tapping methods. Furthermore, in tapping intermittently or continuously, the permissible flow-rate of copper is small in comparison with that which would obtain if the furnace were tapped less frequently. It is, therefore, necessary to employ a small diameter taphole, which, of itself, prevents the use of some conventional tapping methods. Also, the low copper flow-rate coupled with a relatively high copper melting point, would result in a tendency for the copper to chill and freeze in the taphole preventing the further flow of copper.

It has now been found that the problems of continuously tapping copper from an apparatus for the continuous smelting and converting of copper concentrates and ores, can be overcome by the provision of a small furnace provided with one or more burners, which hereinafter, will be referred to by the term "taphole furnace," and which is installed at the outer or outlet end of the copper taphole, the taphole and the surrounding refractory exposed in the taphole furnace then being heated to a temperature which can be controlled at will from a temperature substantially above the melting point of copper down to about 1200° F.

It is, therefore, an object of the present invention to provide an improved method for preparing and feeding copper concentrates and ores to a continuous smelting and converting apparatus.

By one aspect of the present invention, there is provided an improved method of preparing and feeding copper concentrates and ores to an apparatus for continuous smelting and converting of copper concentrates and ores which comprises the pelletizing of wet concentrates or ores, with or without additives, with or without mixing a portion or the whole of the silica flux required for converting, the pellets being fed, with or without drying and with or without admixed lumps of silica flux, into the apparatus for continuous smelting and converting in such a manner that a large surface area of the bath is covered with a thin layer of pellets, thus allowing each pellet to come in contact with the liquid bath so that the pellets do not form large masses of unsmelted material but smelt at a very high rate per unit surface area of the bath.

It has now been found that heat transfer to the charge is enhanced when the charge is in the form of pellets, produced prior to introduction into the continuous smelting and converting furnace. Copper concentrates produced by flotation, can be pelletized easily without any additive, such as bentonite, and after pelletizing, the pellets may be partially dried prior to introduction into the smelting and converting furnace, depending on the relative costs of drying them prior to or inside the furnace. It has been found that wet pellets from a pelletizing machine can be introduced directly into the continuous smelting and converting furnace without presenting any operating problems, such as for example, the explosions which were sometimes experienced when wet, unpelletized concentrates were charged into a molten bath of slag and matte.

With respect to the silica flux which is required for converting, and which must be charged into the continuous smelting and converting furnace, if it is acceptable from an economic point of view, it is preferable to grind the entire amount of flux to below 10 mesh and to incorporate the flux in the charge pellets, thus producing a type of self-fluxing pellet. The aforementioned procedure simplifies the control of the slag composition and eliminates any possibility of segregation of the flux in the continuous furnace. If, however, incorporation of the entire amount of flux in the pellets is not acceptable, it may be desirable to separate fines less than 10 mesh size from the flux, and to incorporate these in the pellets, thus minimizing the loss of flux fines from the continuous furnace. In addition, the preparation of pellets affords a convenient means of incorporating dust fines from such sources as flues, Cottrell or Cyclone separators and collected from the flue gas exiting from the continuous smelting and converting furnace.

The method of feeding the pellets to the furnace is such that a large area of the bath is covered with pellets fed at such a rate that a relatively thin layer of pellets is formed on the surface of the bath, and slag and matte can circulate freely between adjacent pellets, the circulation being further enhanced by the mixing and agitating action of the air introduced through tuyeres. Consequently, the pellet charge presents a very high surface area per unit weight to heat transfer. It has also been found that the pellets tend to smelt individually without agglomeration into large masses of unsmelted material. Such agglomeration, which may decrease the smelting rate, and particularly in the case of wet material, could entrap gases thus causing minor explosions in the bath. It has also been found that the individual pellets tend to remain coherent while smelting.

Where silica flux is not incorporated in the pellets, or only a part, as for example the fines, is incorporated, it has been found advantageous to feed the required flux, or balance of flux, with the pellets so that a large area of the bath is covered with a relatively thin layer of pellets interspersed with lumps of flux. In this way, both the pellets and the flux present a very high surface area per unit weight to heat transfer. It has been found that there is no tendency for either the pellets or the flux to agglomerate into large masses, and this method of feeding results in greatly increased rates of smelting.

A preferred apparatus for feeding the pellets onto the bath is a type of slinger belt, the speed of which is variable over a given time interval and which is also subjected to a swinging action over a small arc, in both a horizontal and vertical plane, thus resulting in the spreading of the pellets over a wide surface area of the bath. However, any other suitable charging means may be employed.

As indicated a further feature of the present invention is a taphole furnace which is provided at the outer or outlet end of the copper taphole. With this furnace, a temperature profile is established along the axis of the taphole, and similar profiles are established across the surrounding refractory parallel to the taphole, the terminal temperatures of these profiles being determined by the taphole furnace temperature and the temperature of the molten copper in the continuous smelting and converting furnace. When all the temperatures constituting the temperature profile in the taphole are substantially above the melting point of copper, then copper will flow freely and continuously from the taphole without the risk of freezing in the taphole or at its outlet. The temperature profile in the taphole can be controlled to provide a freeze-melt type of valve when intermittent copper tapping is required. Copper in the taphole is heated thereby effecting a change of state from solid copper to liquid copper which can flow through the taphole when it is desirable to tap copper from the continuous smelting and converting furnace. When it is desired to stop the flow of copper from the taphole, the taphole burner is turned down to reduce the taphole temperature, and a clay plug or a metal plug, operated either manually or mechanically, is used to seal the taphole and to stop the flow of copper which then solidifies in the taphole near its outlet end. When it is desired to tap again, the temperature of the furnace taphole is increased, the clay or metal plug is removed, the copper in the taphole is melted and again flows through the taphole. It should be emphasized that the aforementioned plug is to initially stop the flow of copper only and that the copper freezing in the taphole thereafter as a result of decreasing the taphole furnace temperature constitutes the principal barrier to the further flow of copper.

Figure 2:
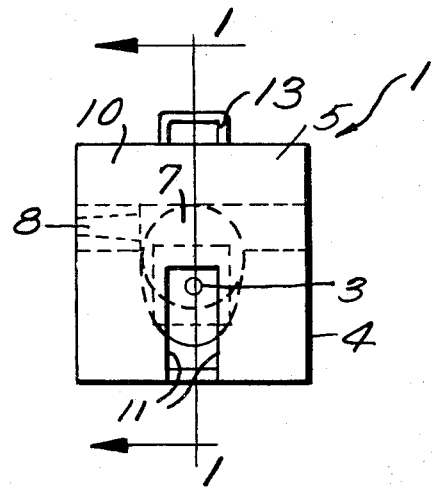

The invention will now be described in more detail with reference to the accompanying drawings in which:

FIG. 1 is a side elevational view of one embodiment of a taphole furnace installed at the outlet end of the copper taphole of a furnace for the continuous smelting and converting of copper concentrates; and FIG. 2 is an end elevational view of the taphole furnace.

In FIGS. 1 and 2, the taphole furnace is shown mounted on a continuous smelting and converting furnace 2, at the outlet end of the copper taphole 3. The taphole furnace 1 comprises a steel shell 4 lined with a suitable refractory 5, and attached to the steel shell 6 of the smelting and converting furnace 2, preferably in such a manner as to be detachable for purposes of maintenance and repair of either the taphole furnace or the copper taphole. The refractory lining 5 of the taphole furnace 2 is installed in such a manner as to provide a cylindrical, conical, or ellipsoidal chamber 7, axial with the taphole in order that a spiralling motion may be imparted to the flame from the burner port 8, and the combustion gases, in their travel to the combustion gas exhaust port 9. The burner port 8 and the combustion exhaust port 9 are preferably located tangentially to the chamber 7 in the taphole furnace. Any suitable gas or oil-fired burner may be used in the burner port 8. The refractory lining in the bottom of the taphole furnace is sloped so that molten copper issuing from the taphole will run freely through the taphole furnace and out into a suitable ladle, mould or similar receptacle. It is preferable to construct the taphole furnace with a sliding door 10, at its front end, said door being provided with a slot 11 which allows access for plugging the taphole and allows the molten copper to flow out of the taphole furnace. A handle 13 is also provided on door 10 to facilitate sliding. It has been found desirable that the refractory enclosing the copper taphole 3, which may be in the form of one or more tapping blocks 12, should have a high thermal conductivity, in order that the temperature profile in the taphole will respond quickly to temperature changes effected in the taphole furnace.

By way of example, a pilot scale furnace was equipped with a taphole furnace with outside dimensions of 18 inches x 18 inches x 18 inches, and with an internal space substantially cylindrical, having a diameter of approximately 12 inches. The taphole furnace was located axial to, and at the outlet end of, a taphole forming part of a furnace containing molten copper. The taphole was ¾ inch in diameter and 9 inches long, and was formed in a chrome-magnesite tapping block. The taphole furnace was provided with a burner with a gas burning capacity of 140,000 B.t.u./hr. With an initially cold taphole furnace, a copper rod extending through the length of the taphole was melted out and copper starting flowing 6 hours after the taphole furnace was fired up. It was found, however, that the heating time was strongly dependent on the initial temperature of the taphole furnace. When the taphole furnace was still hot when fired up, as for example after tapping and plugging, only one to five minutes elapsed before the frozen copper in the taphole melted and a copper flow was started. In the tests, the copper flow was stopped by decreasing the taphole furnace temperature and plugging the taphole with a small extruded clay plug, or with a water-cooled conical steel plug. In most tests, the plugs were removed mechanically after firing up the taphole furnace and just prior to the time when it was desired to tap, which was then done by melting the copper in the taphole. In some tests, the clay plug was allowed to be forced out by the newly melted copper in the taphole. The maximum taphole furnace temperature was approximately 2100° F., and the copper flow rates were 150–300 lb./min.

The above improvement in feeding and tapping is clearly an important development in the continuous smelting and converting of copper concentrates to metallic copper.

We claim:
1. A continuous process for smelting and converting copper concentrates to metallic copper, which comprises the steps of feeding flux and concentrates into a furnace, smelting the concentrates and flux in a liquid bath, allowing the resultant matte and slag to flow toward tapping ports in the furnace, introducing an oxidizing gas into the matte sufficient to oxidize any ferrous sulphide present, introducing an oxidizing gas into the resultant white metal gradually to oxidize copper sulphide to metallic copper, allowing the copper to separate from the slag and tapping the metallic copper, wherein the concentrates are fed into the furnace in the form of pellets in such a manner that a substantial portion of the surface area of the liquid bath is covered with a uniformly disposed thin layer of pellets, the feeding of the pellets being so controlled as to prevent the pellets from forming masses of unsmelted material.

2. A process as claimed in claim 1 wherein the pellets of concentrate incorporate at least a portion of the flux required for smelting.

3. A process as claimed in claim 2 wherein the flux is ground to an average particle size of below 10 mesh (ASTM standard sieve) before being incorporated in the pellets of concentrate.

4. A process as claimed in claim 1 wherein the pellets of concentrate are mixed with the silica flux.

5. A process as claimed in claim 1 wherein the pellets are dried before they are fed into the furnace.

6. A process as claimed in claim 1 wherein the pellets are fed to the furnace when wet.

References Cited

UNITED STATES PATENTS

| | | | |
|---|---|---|---|
| 1,860,585 | 5/1932 | Lenander | 75—74X |
| 2,060,133 | 11/1936 | Summey | 75—93X |
| 2,265,284 | 12/1941 | Hulme | 75—76 |
| 2,995,780 | 8/1961 | West | 75—3X |
| 3,235,371 | 2/1966 | Volin | 75—3 |
| 3,281,236 | 10/1966 | Meissner | 75—73 |
| 3,326,671 | 6/1967 | Worner | 75—73X |
| 3,351,462 | 11/1967 | Arentzen | 75—10X |
| 3,437,475 | 4/1969 | Themelis | 75—10X |

L. DEWAYNE RUTLEDGE, Primary Examiner

J. E. LEGRU, Assistant Examiner

U.S. Cl. X.R.

75—72, 74, 76